(12) United States Patent
Miyajima (10) Patent No.: US 11,792,530 B2
(45) Date of Patent: Oct. 17, 2023

(54) IMAGE PICKUP APPARATUS CAPABLE OF CONTROLLING APERTURE, CONTROL METHOD THEREFOR, AND STORAGE MEDIUM

(71) Applicant: CANON KABUSHIKI KAISHA, Tokyo (JP)

(72) Inventor: Shunsuke Miyajima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/883,747

(22) Filed: Aug. 9, 2022

(65) Prior Publication Data

US 2023/0060140 A1 Mar. 2, 2023

(30) Foreign Application Priority Data

Aug. 25, 2021 (JP) .................................. 2021-137281

(51) Int. Cl.
*H04N 23/73* (2023.01)
*H04N 23/71* (2023.01)

(52) U.S. Cl.
CPC ............. *H04N 23/73* (2023.01); *H04N 23/71* (2023.01)

(58) Field of Classification Search
CPC ........ H04N 23/73; H04N 23/71; H04N 23/70; H04N 23/72; H04N 23/74; H04N 23/75
See application file for complete search history.

(56) References Cited

U.S. PATENT DOCUMENTS

| 8,970,731 | B2 * | 3/2015 | Song | H04N 25/533 348/229.1 |
| 9,712,758 | B2 * | 7/2017 | Noda | H04N 23/75 |
| 2015/0062412 | A1 * | 3/2015 | Kasai | H04N 23/663 348/363 |
| 2015/0181102 | A1 * | 6/2015 | Oda | H04N 23/741 348/229.1 |
| 2018/0035034 | A1 * | 2/2018 | Nakata | H04N 23/71 |

FOREIGN PATENT DOCUMENTS

| JP | 2013-098779 A | 5/2013 |
| JP | 2018-019288 A | 2/2018 |

* cited by examiner

*Primary Examiner* — Luong T Nguyen
(74) *Attorney, Agent, or Firm* — Cowan, Liebowitz & Latman, P.C.

(57) ABSTRACT

An image pickup apparatus which reduces the time required to achieve correct exposure while reducing deterioration of an aperture and changes in the exposure of an image. A correct exposure is calculated from a subject brightness. A setting value of the aperture is discretely calculated from the correct exposure. A first target value is calculated from a present value of the aperture and the correct exposure. A second target value closer to the setting value than the first target value, is calculated from the present value of the aperture, correct exposure, and first target value. While the aperture is driven to reach the second target value from the first target value, shutter speed and/or gain is changed. The aperture is driven at a first drive speed to reach the first target value and then driven at a second drive speed to reach the second target value.

14 Claims, 6 Drawing Sheets

IMAGE PICKUP APPARATUS CAPABLE OF CONTROLLING APERTURE, CONTROL METHOD THEREFOR, AND STORAGE MEDIUM

BACKGROUND OF THE INVENTION

Field of the Invention

The present invention relates to an image pickup apparatus, a control method therefor, and a storage medium, and in particular to an image pickup apparatus capable of controlling aperture, a control method therefor, and a storage medium.

Description of the Related Art

There is a conventional technique that provides a plurality of exposure parameters for an image pickup apparatus, controls them in combination or controls at least one of them to maintain correct exposure in the image pickup apparatus. The plurality of exposure parameters for the image pickup apparatus generally includes an aperture value of a lens, shutter speed of the image pickup apparatus, digital gain to be applied to a shot image, and so forth. The aperture value is set by mechanically driving an aperture of the lens. In view of the durability of the aperture, it is preferred that the aperture value setting is changed with low frequency. On the other hand, when video is shot, the frequency with which the aperture value setting is changed tends to increase. For this reason, Japanese Laid-Open Patent Publication (Kokai) No. 2018-19288 discloses a technique for discretely changing the aperture value so as to decrease the frequency with which the aperture is driven and reduce the deterioration thereof.

However, according to the technique disclosed in Japanese Laid-Open Patent Publication (Kokai) No. 2018-19288, no consideration is given to exposure conditions changing significantly when the aperture value is discretely changed. When this technique is used to shoot a still image, the image pickup apparatus can achieve correct exposure by controlling exposure parameters other than an aperture value between the time the aperture value is changed and the time the shooting is started. On the other hand, when this technique is used to shoot video, the video is shot at a constant frame rate, and hence it is preferred that correct exposure is always maintained in the image pickup apparatus. It is theoretically possible for the image pickup apparatus to maintain correct exposure by controlling gain and shutter speed in accordance with operation of the aperture; however, it is not easy to control them in accordance with operation of the aperture whose aperture value is discretely changed.

To address the problem that exposure conditions are significantly changed due to operation of the aperture, Japanese Laid-Open Patent Publication (Kokai) No. 2013-98779 discloses a technique for changing the aperture in steps by a unit amount at a time. According to this technique, to maintain correct exposure in the image pickup apparatus, the gain is also controlled while the aperture is being driven. According to the technique disclosed in Japanese Laid-Open Patent Publication (Kokai) No. 2013-98779, since the gain is controlled while the aperture is being driven in steps, correct exposure is maintained in the image pickup apparatus, and also the effects on exposure caused by the operation of the aperture are reduced.

However, according to the technique disclosed in Japanese Laid-Open Patent Publication (Kokai) No. 2013-98779, since the aperture is driven in steps, it takes a long time for the aperture value to reach a final target value. Moreover, according to this technique, to maintain correct exposure in the image pickup apparatus the gain is controlled while the aperture is being driven, and it is necessary to apply high gain when a subject is dark. If high gain is applied to an image, noise in the image may also be amplified, causing deterioration of image quality. Therefore, in view of the noise, an upper limit needs to be placed on the gain while the aperture is being driven; however, if the upper limit is placed on the gain, correct exposure cannot be maintained even if the gain is controlled while the aperture is being driven. It is thus desirable that the aperture value reach the target value as fast as possible.

SUMMARY OF THE INVENTION

The present invention provides an image pickup apparatus which is capable of preventing an increase in the time required to reach correct exposure while suppressing deterioration of an aperture and reducing changes in the exposure of an image caused by exposure control, a control method therefor, and a storage medium.

Accordingly, the present invention provides an image pickup apparatus that picks up an image, comprising an aperture configured to be driven to adjust the amount of light entering the image pickup apparatus, an image pickup device configured to photoelectrically convert a flux of the entered light to generate an image signal, at least one memory that stores a set of instructions, and at least one processor that executes the instructions, the instructions, when being executed, causing the image pickup apparatus to calculate a subject brightness value from the image signal generated by the image pickup device, calculate a correct exposure based on the obtained subject brightness value, discretely calculate a setting value of the aperture based on the correct exposure, calculate a first target value based on a present value of the aperture and the correct exposure, calculate a second target value, which is closer to the setting value than the first target value, based on the present value of the aperture, the correct exposure, and the first target value, and while the aperture is being driven to reach the second target value from the first target value, change at least one of a shutter speed for image pickup and a gain to be applied to the image signal, wherein the aperture is driven at a first drive speed to reach the first target value and then driven at a second drive speed to reach the second target value.

According to the present invention, it is possible to prevent an increase in the time required to reach correct exposure while suppressing deterioration of an aperture and reducing changes in the exposure of an image caused by exposure control.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof. In the drawings, the same components are designated by the same reference symbols, duplicate detailed description of which, therefore, is omitted.

First Embodiment

First, a description will be given of an image pickup system 1 including an image pickup apparatus 110 according to a first embodiment of the present invention.

Figure 1:
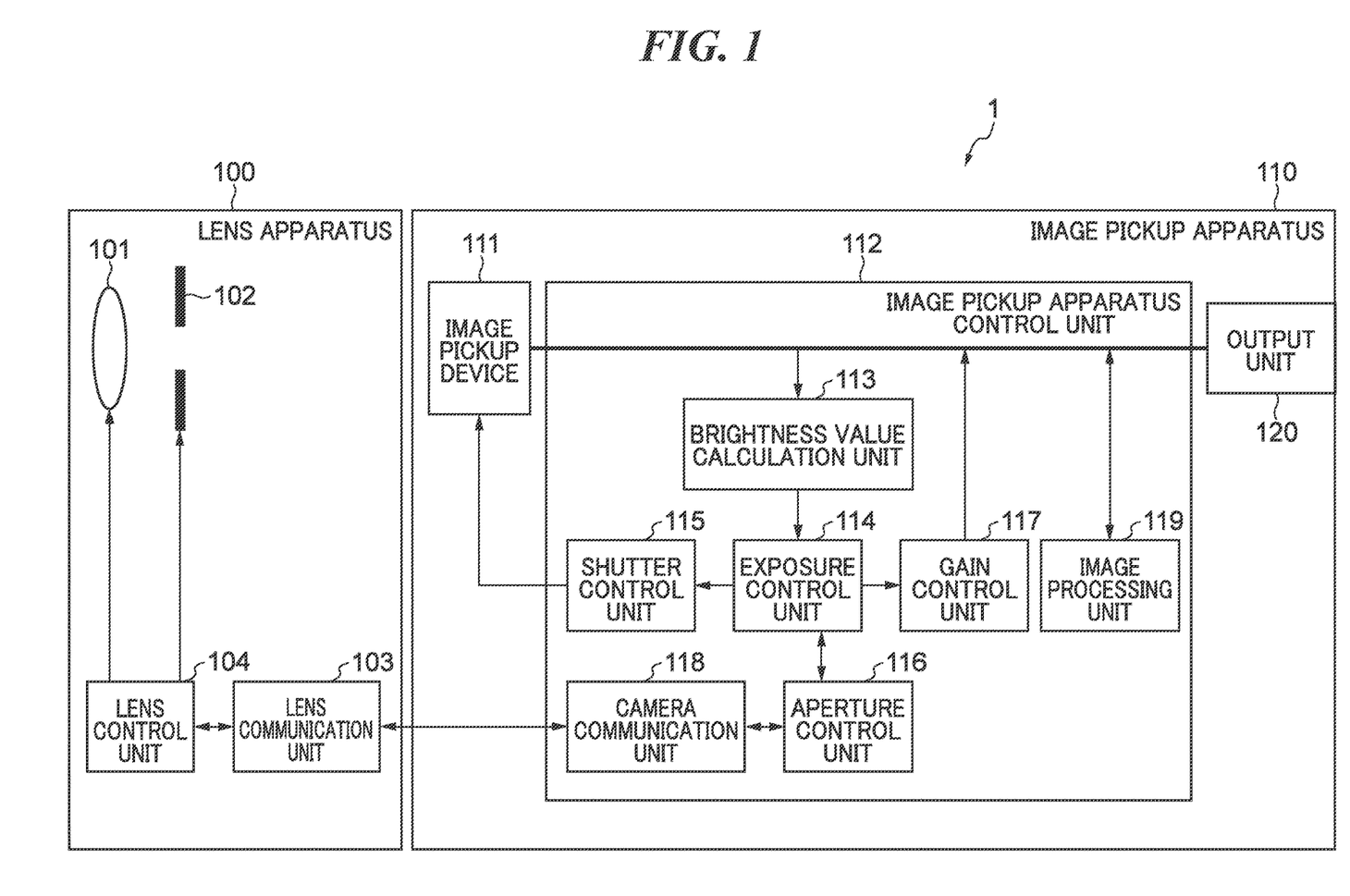
FIG. 1 is a block diagram showing a hardware arrangement of an image pickup system including an image pickup apparatus according to a first embodiment of the present invention.

FIG. 1 is a block diagram showing a hardware arrangement of the image pickup system 1.

The image pickup system 1 has the image pickup apparatus 110 and a lens apparatus 100, which is removably mounted on the image pickup apparatus 110. It should be noted that although in the present embodiment, the lens apparatus 100 is removable from the image pickup apparatus 110, the lens apparatus 100 may be integral with the image pickup apparatus 110.

The image pickup apparatus 110 has an image pickup device 111, an image pickup apparatus control unit 112, and an output unit 120. The image pickup apparatus control unit 112 has a brightness value calculation unit 113, an exposure control unit 114, a shutter control unit 115, an aperture control unit 116, a gain control unit 117, a camera communication unit 118, and an image processing unit 119.

The lens apparatus 100 has a lens 101, an aperture 102, a lens communication unit 103, and a lens control unit 104.

Although in FIG. 1, only one lens is illustrated as the lens 101, the lens 101 is actually comprised of a lens group consisting of a focus lens, a zoom lens, and so forth.

The aperture 102 adjusts the amount of light that enters the image pickup apparatus 110 from the lens 101.

The image pickup device 111 (image pickup means), which is, for example, a CCD or CMOS sensor, receives a light flux that have passed through the lens 101 and the aperture 102, photoelectrically converts it to generate an image signal, and outputs the image signal to the image pickup apparatus control unit 112.

The lens communication unit 103 communicates with the image pickup apparatus 110 via the camera communication unit 118.

The lens control unit 104 controls the lens 101 and the aperture 102 via an actuator (not shown) in the lens apparatus 100 based on operations by a user on an operating member (not shown) of the lens apparatus 100 and/or information obtained from the image pickup apparatus 110 via the lens communication unit 103. The actuator used here is, for example, a DC motor, a stepping motor, or an ultrasonic motor.

The image pickup apparatus control unit 112 is comprised of a CPU.

The brightness value calculation unit 113 (brightness value calculation means) calculates the brightness value of a subject from an image signal output from the image pickup device 111.

The exposure control unit 114 calculates a correct exposure based on a brightness value calculated by the brightness value calculation unit 113 and a brightness value at the time of correct exposure stored in a memory (not shown). Based on various types of information about aperture control which the exposure control unit 114 is notified of by the aperture control unit 116, the exposure control unit 114 also calculates exposure parameters so that the calculated correct exposure can be achieved. Specifically, in the present embodiment, the exposure control unit 114 calculates at least one of the following as an exposure parameter setting value: an aperture value, a gain, and a shutter speed. The brightness value at the time of correct exposure may be either a value at a point or a range of brightness values. The various types of information about aperture control which the exposure control unit 114 is notified of by the aperture control unit 116 will be described in detail later with reference to FIG. 3. How the exposure control unit 114 calculates the setting values will also be described later.

The shutter control unit 115 controls the shutter speed of the image pickup device 111 (the length of time that electrical charges are accumulated by the image pickup device 111) so that it can be equal to a shutter speed calculated by the exposure control unit 114 or a shutter speed set by the user with a setting means (not shown).

The aperture control unit 116 (aperture control means) determines an aperture value calculated by the exposure control unit 114 or an aperture value set by the user with the setting means (not shown) as a setting value, and controls the aperture 102 so that the determined setting value can be achieved. In the present embodiment, the aperture control unit 116 controls the aperture 102 by communicating with the lens apparatus 100 via the camera communication unit 118. However, if the lens apparatus 100 and the image pickup apparatus 110 are configured as an integral unit, the aperture control unit 116 may control the aperture 102 without using the camera communication unit 118. The aperture control unit 116 also notifies the exposure control unit 114 of various types of information about aperture control. An aperture control process carried out by the aperture control unit 116 will be described in detail later with reference to FIG. 3.

The gain control unit 117 applies a gain calculated by the exposure control unit 114 or a gain set by the user using a setting means (not shown) to an image signal output from the image pickup device 111.

The image processing unit 119 performs image processing on an image signal output from the image pickup device 111. Examples of the image processing include gamma correction and debayering.

The output unit 120 outputs an image signal, which has been subjected to various types of image processing and output from the image pickup apparatus control unit 112, to a display apparatus (not shown) or a recording apparatus (not shown).

Figure 2:
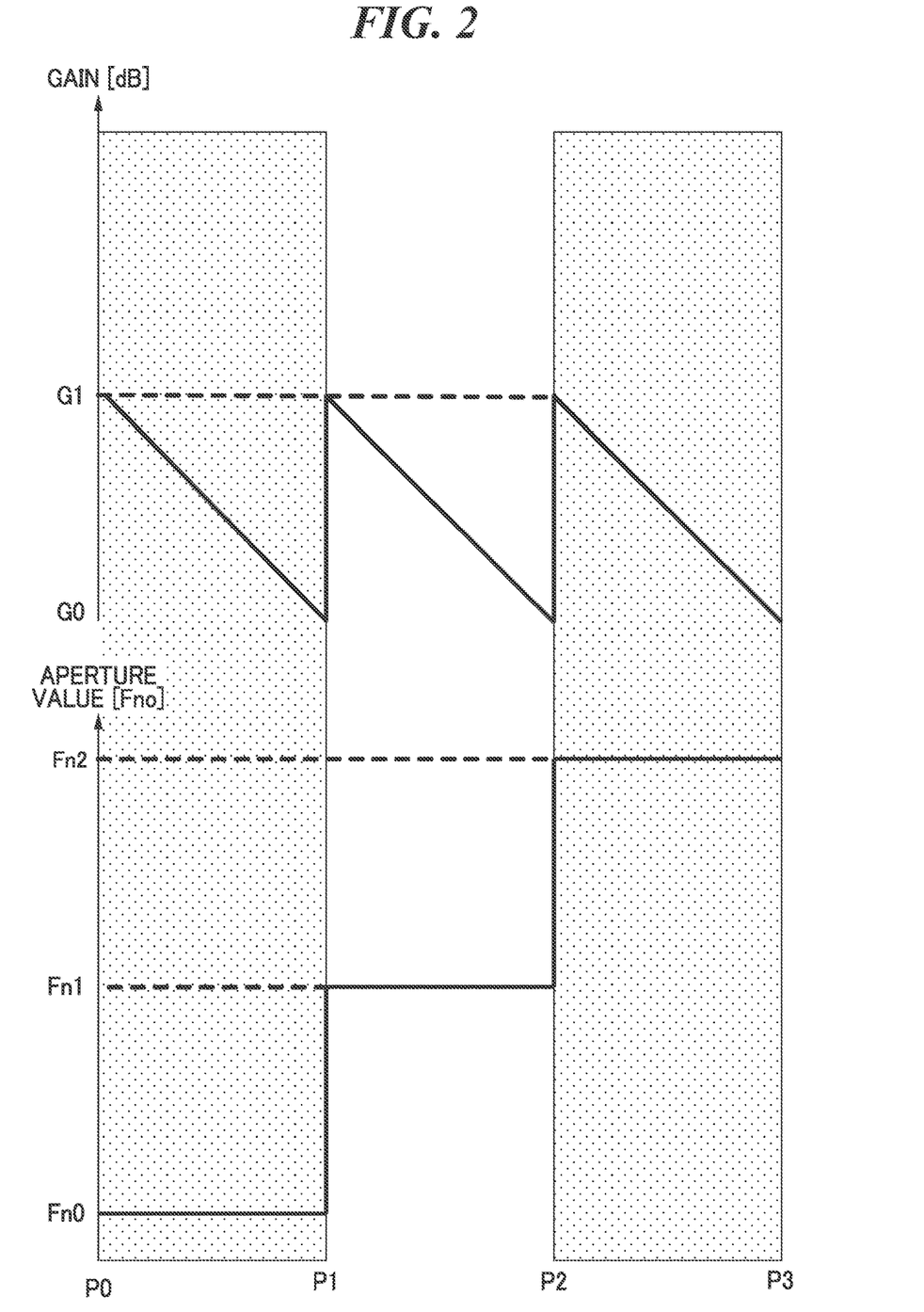
FIG. 2 is a program diagram of exposure control according to the first embodiment of the present invention.

Referring to FIG. 2, a description will now be given of how the exposure control unit 114 sets the setting values. In the present embodiment, for example, a 1 EV change in brightness is expressed by a one-step change in exposure.

FIG. 2 is a program diagram of exposure control according to the first embodiment. The upper half of FIG. 2 shows values of gain that is applied to an image signal output from the image pickup device 111, and the lower half of FIG. 2 shows aperture values of the aperture 102.

The vertical axes in the upper half and the lower half of FIG. 2 indicate values of gain expressed in dB and aperture values expressed as f-numbers, respectively. Namely, the greater the value of gain to be applied, the greater the amount of amplification of an image signal, and also, the greater the aperture value, the smaller the diameter of the aperture 102.

The horizontal axis represents points in the program diagram so that a gain and an aperture value at each point can be derived. As the subject brightness increases (an image gets lighter), the program diagram goes from the point P0 to the point P3. As the subject brightness decreases (an image gets darker), the program diagram goes from the point P3 to the point P0. The exposure control unit 114 controls gain between the point P0 and the point P1, the point P1 and the point P2, and the point P2 and the point P3. In the present embodiment, if the gain is too high, noise components in an image will be conspicuous, and hence in view of image quality, the highest gain is limited up to G1 dB.

The exposure control unit 114 (setting value calculation means) calculates the setting value of the aperture 102 during each transition between the points mentioned above based on a correct exposure calculated from a subject brightness value. For example, in some cases, an exposure is higher than the correct exposure at the time when the gain reaches G0 dB between the point P0 and the point P1. In this case, the exposure control unit 114 controls the setting value of the aperture 102 to be Fn1 from Fn0. Likewise, in some cases, an exposure is higher than the correct exposure at the time when the gain reaches G0 dB between the point P1 and the point P2. In this case, the exposure control unit 114 controls the setting value of the aperture 102 to be Fn2 from Fn1. Here, aperture values expressed as Fn0, Fn1, and Fn2, which are f-numbers, are values of which differences (intervals) between two values (numbers) are the same, and values discrete relative to the minimum drive resolution of the aperture 102. For this reason, it is preferred that the difference between the two gains of G0 dB and G1 dB is the same as the difference between Fn0 and Fn1 and the difference between Fn1 and Fn2 in terms of the number of steps.

As described in Japanese Laid-Open Patent Publication (Kokai) No. 2018-19288, by discretely moving the aperture 102 as described above, the frequency with which the aperture 102 is driven can be decreased to reduce the deterioration of the aperture 102. Moreover, in the present embodiment, to prevent exposure conditions from significantly changing at a time, the gain or shutter speed is set based on the movement of the aperture 102 when the aperture 102 is driven. Detailed description thereof will be given later.

Furthermore, although in the present embodiment, the program diagram comprised of the combination of aperture values and gains as shown in FIG. 2 is used, instead of the program diagram of FIG. 2, any program diagram may be used as long as exposure parameters can be controlled such that exposure conditions are prevented from significantly changing at a time. For example, a program diagram comprised of a combination of aperture values and shutter speeds, or a program diagram comprised of a combination of aperture values, shutter speeds, and gains, may be used. Moreover, although in the present embodiment, the highest gain is limited to G1 dB in view of image quality, this is not limitative. For example, if the correct exposure cannot be achieved even by adjusting the aperture value or shutter speed because a subject is too dark, the gain may be set high even though image quality is scarified. This is because even if image quality is sacrificed, setting the gain high makes it possible to recognize at least the subject.

Figure 3:
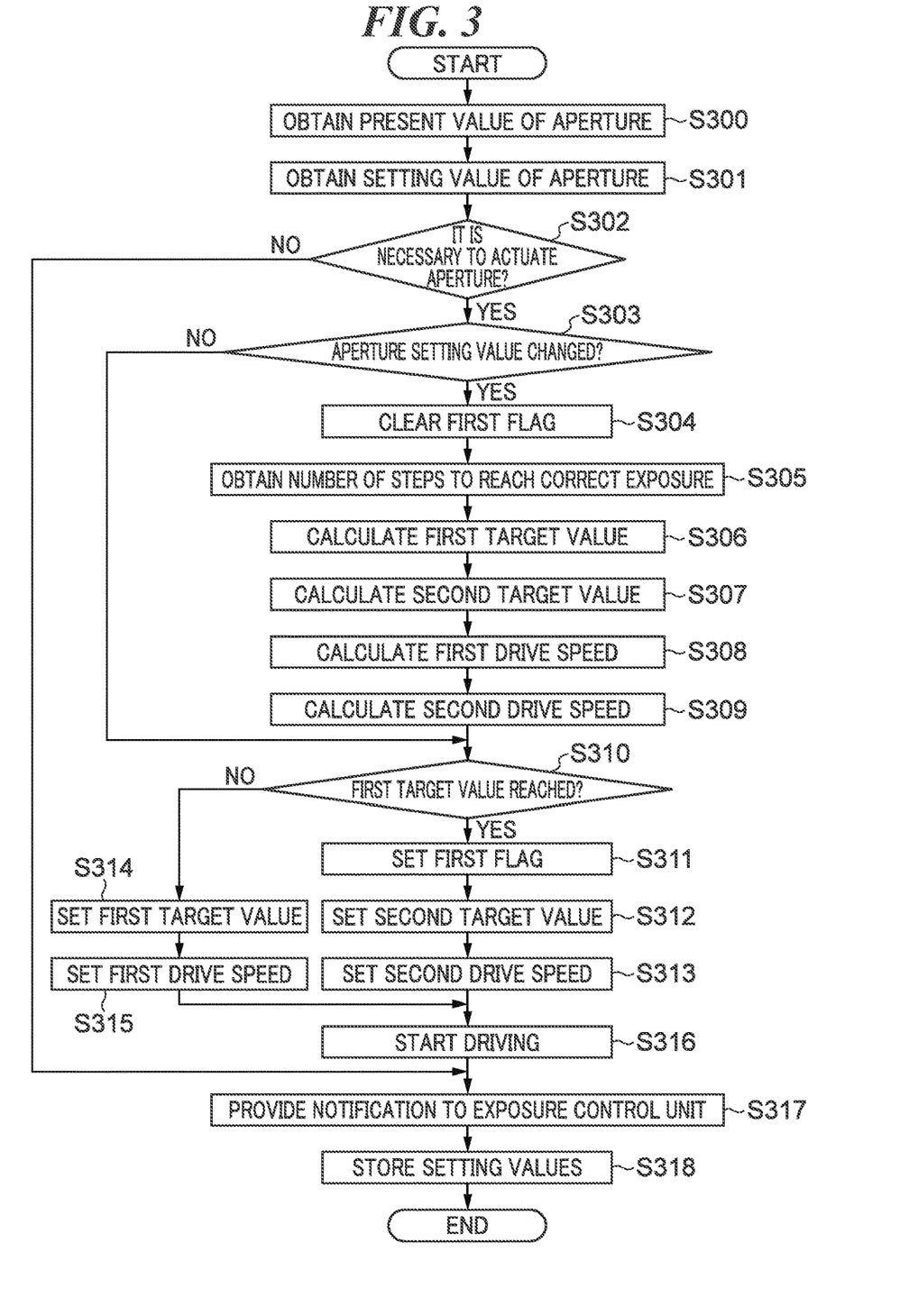
FIG. 3 is a flowchart of an aperture control process according to the first embodiment of the present invention.

Referring to FIG. 3, a description will now be given of an aperture control process that is carried out by the aperture control unit 116. FIG. 3 is a flowchart of the aperture control process according to the first embodiment. The aperture control process is repeatedly carried out at regular intervals by the aperture control unit 116 of the image pickup apparatus control unit 112, which is a CPU, developing a program held in a ROM (not shown) of the image pickup apparatus 110 onto a RAM (not shown).

First, in step S300, the aperture control unit 116 obtains a present value of the aperture 102. The present value of the aperture 102 is received from the lens apparatus 100 via the camera communication unit 118. The present value of the aperture 102, however, may be detected or held by the image pickup apparatus 110.

In step S301, the aperture control unit 116 obtains a setting value of the aperture 102 calculated by the exposure control unit 114.

In step S302, the aperture control unit 116 compares the present value of the aperture 102 obtained in the step S300 and the setting value of the aperture 102 obtained in the step S301 with each other, and determines whether or not it is necessary to drive the aperture 102. Specifically, when the present value of the aperture 102 and the setting value of the aperture 102 correspond to each other, the aperture control unit 116 determines that it is unnecessary to drive the aperture 102. It should be noted that the aperture control unit 116 may determine that it is unnecessary to drive the aperture 102 when the difference between the present value of the aperture 102 and the setting value of the aperture 102 is within an arbitrary range. As a result of the determination, when it is determined that it is necessary to drive the aperture 102, the process proceeds to step S303. When it is determined that it is unnecessary to drive the aperture 102, the process proceeds to step S317.

In the step S303, the aperture control unit 116 determines whether or not the setting value of the aperture 102 has changed. Specifically, the aperture control unit 116 determines whether or not there is a difference between a "previous setting value", which is a setting value of the aperture 102 stored into the memory (not shown) when the present process was carried out at least last time, and the "present setting value", which is the setting value of the aperture 102 obtained in the step S301. When the previous setting value and the present setting value correspond to each other or the difference between them is within an arbitrary range, it is determined that the setting value of the aperture 102 has not changed. When it is determined that the setting value of the aperture 102 has changed from the previous setting value, the process proceeds to step S304. On the other hand, when the setting value of the aperture 102 has not changed, the process proceeds to step S310.

In the step S304, the aperture control unit 116 clears a first flag. The first flag is set when a first target value, which will be described later, has been reached.

In step S305, the aperture control unit 116 obtains the number of steps requires to reach the correct exposure (state) from the present exposure (state), from the exposure control unit 114 (correct exposure step count obtaining means). The number of steps is calculated by comparing a brightness value calculated by the brightness value calculation unit 113 and a brightness value at the time of a correct exposure stored in the memory (not shown). It should be noted that the exposure control unit 114 also calculates the number of steps from the present exposure to the correct exposure in the process of calculating each setting value.

In step S306, the aperture control unit 116 calculates the first target value of the aperture 102 based on the present value of the aperture 102, the setting value of the aperture 102, and the number of steps required to reach the correct exposure obtained in the step S305 (first target value calculation means). The first target value is an aperture value discrete relative to the minimum drive resolution of the aperture 102 and is set within the range between the present value of the aperture 102 and the setting value of the aperture 102. Specifically, the first target value is a value that is the number of steps to the correct exposure away from the present value of the aperture 102.

In step S307, the aperture control unit 116 calculates a second target value of the aperture 102 based on the present value of the aperture 102, the setting value of the aperture 102, the number of steps requires to reach the correct exposure, and the first target value calculated in the step S306 (second target value calculation means). The second target value is a value that is closer to the setting value of the aperture 102 obtained in the step S301 than the first target value and is an aperture value discrete relative to the minimum drive resolution of the aperture 102. In the present embodiment, the setting value is set as the second target value in the step S307.

In step S308, the aperture control unit 116 calculates a first drive speed at which the aperture 102 is driven to reach the first target value calculated in the step S306. The higher the first drive speed is, the more desirable it is, and for example, the first drive speed is set to a maximum speed at which the aperture 102 can be driven.

In step S309, the aperture control unit 116 calculates a second drive speed at which the aperture 102 is driven to reach the second target value calculated in the step S307.

In the step S310, the aperture control unit 116 determines whether or not the aperture 102 has reached the first target value set in the step S306. Specifically, in the case where the first flag is set, or in the case where the present value of the aperture 102 obtained in the step S300 corresponds to the first target value calculated in the step S306 or the difference between them is within an arbitrary range, it is determined that the aperture 102 has reached the first target value. When it is determined that the aperture 102 has reached the first target value, the process proceeds to step S311. When it is determined that the aperture 102 has not reached the first target value, the process proceeds to step S314.

In the step S311, the aperture control unit 116 sets the first flag. Setting the first flag indicates that the aperture 102 has reached the first target value.

In step S312, the aperture control unit 116 sets, for the lens apparatus 100, the second target value in the step S307 as the target value of the aperture 102 (second drive target value setting means).

In step S313, the aperture control unit 116 sets, for the lens apparatus 100, the second drive speed calculated in the step S309 as the drive speed at which the aperture 102 is driven to reach the second target value set in the step S312, and then the process proceeds to step S316.

In the step S314, the aperture control unit 116 sets, for the lens apparatus 100, the first target value calculated in the step S306 as the target value of the aperture 102 (first drive target value setting means).

In step S315, the aperture control unit 116 sets, for the lens apparatus 100, the first drive speed calculated in the step S308 as the drive speed at which the aperture 102 is driven to reach the first target value set in the step S314, and then the process proceeds to the step S316.

In the step S316, the aperture control unit 116 instructs the lens apparatus 100 to start driving the aperture 102. Note that the lens apparatus 100 may be configured to start driving the aperture 102 when the target value and the drive speed are set.

In the step S317, the aperture control unit 116 notifies the exposure control unit 114 of various types of information about aperture control. Specifically, the various types of information about aperture control are information indicating whether or not the first flag is set, the present value of the aperture 102, and the target value and the drive speed of the aperture 102 set for the lens apparatus 100.

In step S318, the aperture control unit 116 stores the setting value of the aperture 102 which was obtained in the step S301, in the memory (not shown), and ends the present process.

Figure 4:
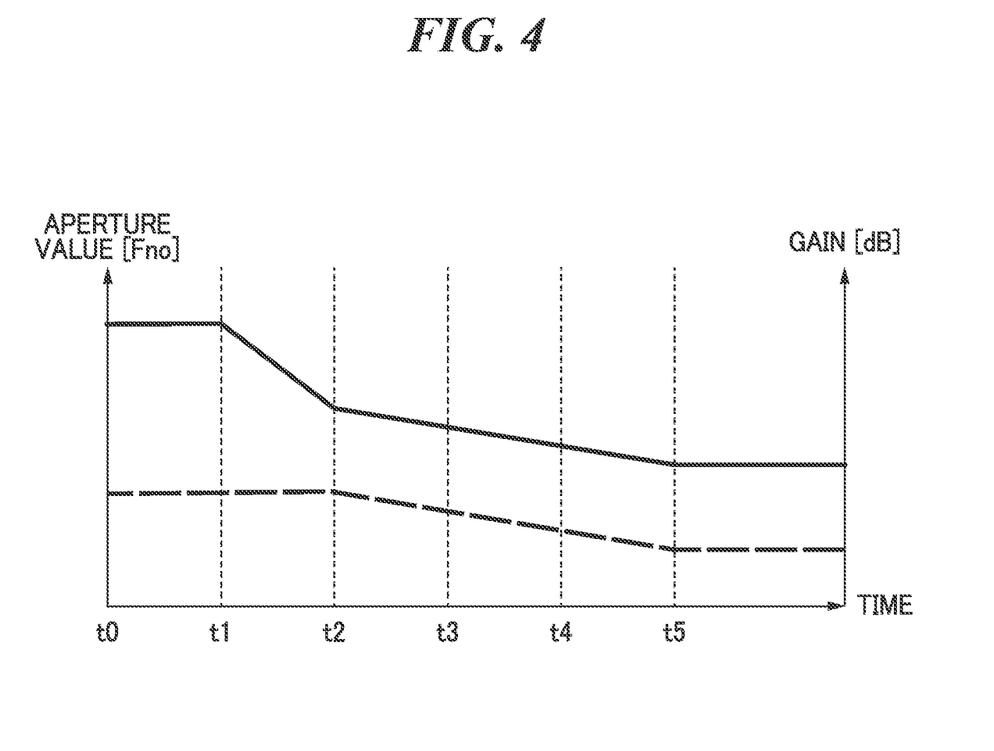
FIG. 4 is a view showing an example of exposure control according to the first embodiment of the present invention, which is performed by an exposure control unit, an aperture control unit, and a gain control unit in FIG. 1.

Referring to FIG. 4, a description will now be given of an example of exposure control according to the first embodiment, which is performed by the exposure control unit 114, the aperture control unit 116, and the gain control unit 117.

In FIG. 4, the horizontal axis represents time, the left vertical axis represents aperture values (f-numbers) of the aperture 102, and the right vertical axis represents values of gain (dB) to be applied to an image signal output from the image pickup device 111. The solid line indicates a trajectory that represents time change in the aperture value of the aperture 102 controlled by the aperture control unit 116 in the aperture control process in FIG. 3. The one dot chain line indicates a trajectory taken by the value of gain controlled by the gain control unit 117 in the aperture control process in FIG. 3. The period from the time t0 to the time t5 is, for example, a cycle of control by the image pickup apparatus control unit 112, and each process is carried out in the image pickup apparatus control unit 112 at regular intervals (at the control cycle).

The aperture 102 is driven discretely (by a predetermined multiple of the minimum drive resolution) relative to the minimum drive resolution (0.5 step in terms of the number of steps) of the aperture 102 in view of the deterioration described above with reference to FIG. 2. In the present embodiment, the aperture 102 is driven at intervals of two steps in terms of the number of steps (a quadruple of the minimum drive resolution). It is assumed that the interval between the upper limit and the lower limit to the gain is two steps in terms of the number of steps. It should be noted that in the aperture control process in FIG. 3, not only the aperture 102 but also the gain is controlled to achieve the correct exposure.

At the time t0, the exposure state is the correct exposure, at which the exposure control at the point P1 (the aperture value: Fn1, the gain: G1 dB) in the program diagram of FIG. 2 is being performed.

Assume that from this state, the subject brightness decrease by 1.5 steps during the time from the time t0 to the time t1. At the time t1, since the subject brightness has decreased, the exposure control unit 114 calculates a setting value for achieving the correct exposure. Here, since the subject brightness has decreased by 1.5 steps, the correct exposure is achieved by calculating the setting value of the aperture 102 so as to control exposure such that the subject brightness will increase by 1.5 steps. Namely, the exposure control unit 114 controls the gain so as to increase the value thereof, and controls the aperture 102 so as to decrease the aperture value thereof. Note that at the time t1, the aperture value of the aperture 102 is Fn1, and the gain is G1 dB in the program diagram of FIG. 2. At this time, since the gain has reached the upper limit, the gain control unit 117 cannot raise the gain anymore. Therefore, the exposure control unit 114 increases exposure by changing the setting value of the aperture 102 from Fn1 to Fn0 to make a transition from the point P1 to the point P0. Namely, at the time t1, the exposure control unit 114 calculates the setting value (Fn0) of the aperture 102.

The aperture control unit 116 controls the aperture 102 according to the procedure of the aperture control process in FIG. 3. At the time t1, the aperture control unit 116 determines in the step S302 that it is necessary to drive the aperture 102, and determines in the step S303 that the setting value (Fn0) of the aperture 102 at the present time t1 has changed from the setting value (Fn1) of the aperture 102 at the time to. Then, in the steps S306 to S309, the aperture control unit 116 calculates the first target value and second target value of the aperture 102 and the first drive speed and second drive speed of the aperture 102. In the present embodiment, the first target value of the aperture 102 is a value that is obtained by changing the aperture value of the aperture 102 toward Fn0 by 1.5 steps from Fn1, which is the present value. The second target value of the aperture 102 is set to Fn0. The first drive speed is set to, for example, a maximum speed at which the aperture 102 can be driven, and the second drive speed is set to half the first drive speed. Then, in the step S310, the setting value of the aperture 102 is still the present aperture value (Fn1), and the aperture control unit 116 therefore determines that the aperture 102 has not reached the first target value. Then, in steps S314 and S315, the aperture control unit 116 sets the first target value as the target value of the aperture 102 and sets the first drive speed as the drive speed of the aperture 102, for the lens apparatus 100. After that, in the step S316, the aperture control unit 116 issues an instruction to start driving the aperture 102, drives the aperture 102 at the first drive speed until the first target value is reached, and finishes controlling the aperture 102.

At the time t2, the aperture 102 has reached the first target value (the aperture value shifted by 1.5 steps from Fn1 toward Fn0). Namely, at the time t2, the exposure has increased by 1.5 steps as compared to the time t1 and the exposure state is in the correct exposure. However, it is necessary to further change the aperture value of the aperture 102 by the remaining 0.5 step toward Fn0 at the time t2, because the exposure control is performed by driving the aperture 102 and changing aperture value two steps at a time in terms of the number of steps according to the program diagram of FIG. 2.

In the aperture control process that is repeated periodically, upon determining in the step S310 that the aperture 102 has reached the first target value, the aperture control unit 116 executes the steps S311 to S313. As a result, the target value of the aperture 102 is set to the second target value (Fn0), and the drive speed of the aperture 102 is set to the second drive speed, which are to be sent to the lens apparatus 100. After that, in the step S317, the aperture control unit 116 notifies the exposure control unit 114 of various types of information about aperture control. In the example illustrated in FIG. 4, the various types of information about aperture control include information indicating that the first flag is set, that the present value of the aperture 102 is the first target value, and that the target value and the drive speed of the aperture 102 are the second target value and the second drive speed, respectively.

The exposure control unit 114 (exposure compensation means) calculates a setting value of gain based on the various types of information about aperture control, which the exposure control unit 114 was notified of in the step S317 by the aperture control unit 116. Specifically, the exposure control unit 114 adjusts the gain so that the correct exposure can be maintained even after the aperture 102 reaches the first target value, namely, a change in brightness caused by changing the aperture value of the aperture 102 further by 0.5 step toward the opening direction can be compensated for. For example, the exposure control unit 114 obtains a slope of the number of steps based on the present value, target value, and drive speed of the aperture 102, which the exposure control unit 114 was notified of by the aperture control unit 116, and sets a gain according to the obtained slope so as to compensate for a change in exposure (change in brightness) caused by the operation of the aperture 102 from the time t2 onward. In the case illustrated in FIG. 4, at the time t2, the aperture 102 starts to be driven at the second drive speed toward the second target value, and at the time t5, the aperture 102 reaches the second target value. During this period, the exposure control unit 114 adjusts the gain controlled by the gain control unit 117 so that the change in brightness caused by the operation of the aperture 102 can be compensated for in terms of the number of steps. Thus, during the period from the time t2 to the time t5, the change in exposure caused by the operation of the aperture 102 is compensated for by controlling the gain, and therefore, the correct exposure can be maintained. During the period from the time t1 to the time t2, the aperture 102 is driven at the maximum speed toward the first target value, and hence, the correct exposure can be achieved within a short period of time.

It should be noted that although in the example illustrated in FIG. 4, the exposure control unit 114 calculates the setting value of gain based on the various types of information about aperture control, which the exposure control unit 114 was notified of by the aperture control unit 116 in the step S317, this is not limitative, but a setting value of another exposure parameter other than the aperture value may be calculated. For example, the exposure control unit 114 may calculate a shutter speed of the image pickup device 111 based on the various types of information about aperture control, which the exposure control unit 114 was notified of by the aperture control unit 116.

As described above, in the present embodiment, during exposure control, the setting values are calculated discretely at intervals of two steps to discretely drive the aperture 102. This reduces the frequency with which the aperture 102 is driven, and thus prevents the deterioration of the aperture 102. Moreover, to drive the aperture 102 to the setting value, the aperture 102 is driven at the first drive speed, which is a high speed, until the aperture value at which the correct exposure is achieved (the first target value) is reached. As a result, the correct exposure can be achieved within a relatively short period of time. Furthermore, to drive the aperture 102 by the remaining amount to the setting value (the second target value), the gain or shutter is controlled while the aperture 102 is driven at the second drive speed lower than the first drive speed, and this compensates for the change in exposure caused by the operation of the aperture 102. As a result, the correct exposure can be maintained even after the aperture 102 has reached the setting value. Thus, the following three effects can be achieved at the same time: reducing the deterioration of the aperture 102, reducing changes in the exposure of an image caused by exposure control, and shortening the time required to achieve the correct exposure.

Moreover, although in the present embodiment, the first drive speed is set to the maximum speed at which the aperture 102 can be driven, and the second drive speed is set to half the first drive speed, this is not limitative as long as the first drive speed is set to a higher speed than the second drive speed. For example, the effects of the present invention can be obtained even if the second drive speed is set to a minimum speed at which the aperture 102 can be driven.

Additionally, in the present embodiment, when exposure is controlled, the aperture control process (FIG. 3) in which the two target values are set for the aperture 102 while the aperture 102 is discretely driven is always carried out; however, there may be a predetermined shooting condition for carrying out the aperture control process. For example, when the frequency with which the aperture 102 is driven is high (equal to or higher than a predetermined frequency) in the image pickup system 1, it may be determined that the predetermined shooting condition is satisfied, and the aperture control process may be carried out. Also, when the durability of the aperture 102 of the lens apparatus 100 is not high (equal to or lower than a predetermined durability), it may be determined that the predetermined shooting condition is satisfied, and the aperture control process may be carried out.

Second Embodiment

A second embodiment of the present invention differs from the first embodiment in the way of setting the first target value of the aperture 102. In the first embodiment, the first target value of the aperture 102 is the value that is the number of steps (1.5 steps in the example illustrated in FIG. 4) to the correct exposure away from the present value of the aperture 102. However, there may be a case where the value that is the number of steps to the correct exposure away from the present value of the aperture 102 cannot be set as the first target value, depending on the minimum drive resolution of the aperture 102. Namely, there may be a case where the number of steps from the present value of the aperture 102 to the correct exposure is not a multiple of the minimum drive resolution of the aperture 102. A description will now be given of an aperture control process according to the present embodiment which is carried out with consideration given to such a case. In the following description of the second embodiment, the same components and processes as those in the first embodiment are designated by the same reference symbols, detailed description of which, therefore, is omitted. Only those differing from the first embodiment will be described below.

Figure 5:
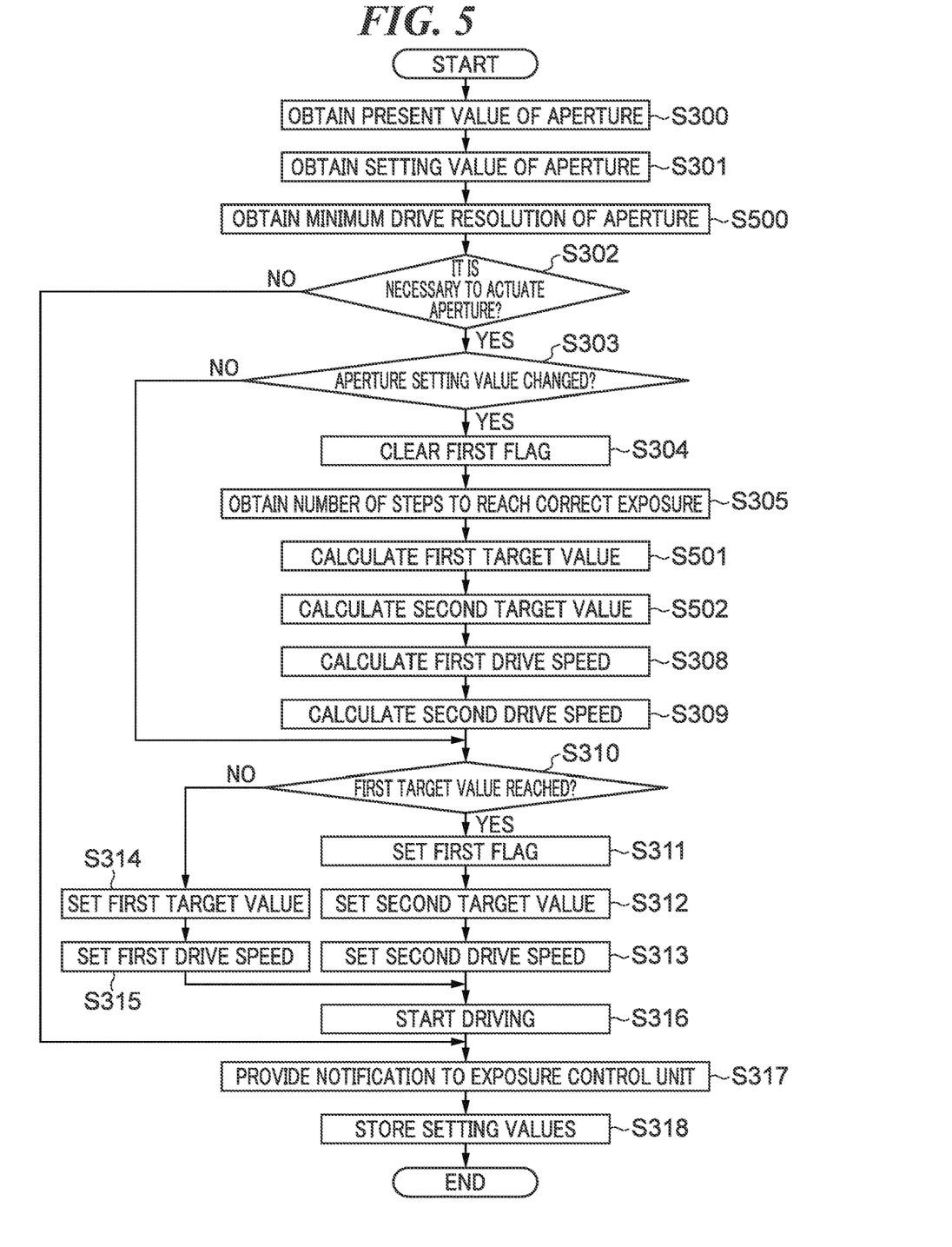
FIG. 5 is a flowchart of an aperture control process according to a second embodiment of the present invention.

FIG. 5 is a flowchart of the aperture control process according to the second embodiment. Referring to FIG. 5, a description will be given of the aperture control process according to the second embodiment which is carried out by the aperture control unit 116. The flowchart of FIG. 5 differs from the flowchart of FIG. 3 in that there is step S500 between the step S301 and the step S302, and there are steps S501 and S502 in place of the step S306 and the step S307.

A description will now be given of the steps S500, S501, and S502 in the flowchart of FIG. 5 which are parts differing from those in the flowchart of FIG. 3.

In the step S500, the aperture control unit 116 obtains the minimum drive resolution of the aperture 102. The minimum drive resolution may be obtained when the lens apparatus 100 is mounted on the image pickup apparatus 110, and the camera communication unit 118 and the lens communication unit 103 starts communicating with each other, or may be stored in advance in the memory (not shown) of the image pickup apparatus 110.

In the step S501, the aperture control unit 116 calculates a first target value of the aperture 102 based on the present value and setting value of the aperture 102, the number of steps to the correct exposure, and the minimum drive resolution of the aperture 102. Detailed description of how to calculate the first target value in the step S501 will be given later.

In the step S502, the aperture control unit 116 calculates a second target value of the aperture 102 based on the present value and setting value of the aperture 102, the number of steps to the correct exposure, the first target value, and the minimum drive resolution of the aperture 102. The second target value is set to, for example, the setting value of the aperture 102 obtained in the step S301.

Figure 6:
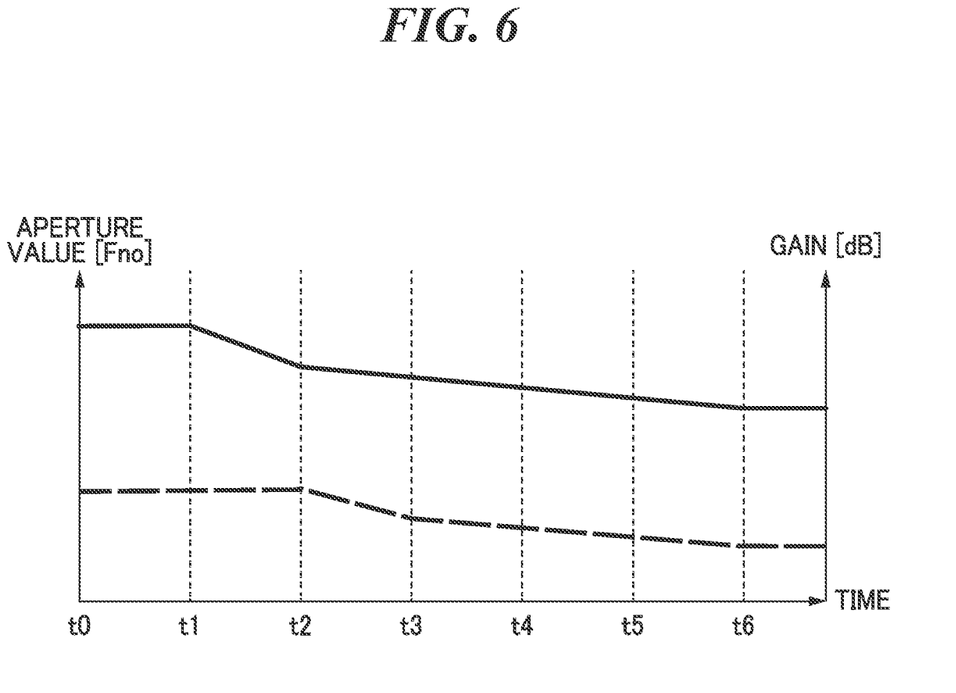
FIG. 6 is a view showing an example of exposure control according to the second embodiment of the present invention, which is performed by the exposure control unit, the aperture control unit, and the gain control unit in FIG. 1.

Referring to FIG. 6, a description will now be given of an example of exposure control according to the second embodiment, which is performed by the exposure control unit 114, the aperture control unit 116, and the gain control unit 117, including how the first target value is calculated in the step S501.

In FIG. 6, as with FIG. 4, the horizontal axis represents time, the left vertical axis represents aperture values (f-numbers) of the aperture 102, and the right vertical axis represents values of gain (dB) to be applied to an image signal output from the image pickup device 111. The solid line indicates a trajectory that represents time change in the aperture value of the aperture 102 controlled by the aperture control unit 116 in the aperture control process in FIG. 5. The one dot chain line indicates a trajectory taken by the value of gain controlled by the gain control unit 117 in the aperture control process in FIG. 5. The period from the time t0 to the time t5 is, for example, a cycle of control by the image pickup apparatus control unit 112, and each process is carried out in the image pickup apparatus control unit 112 at regular intervals (at the control cycle). It should be noted that the minimum drive resolution of the aperture 102 in the present embodiment is assumed to be 0.5 step.

Also in the present embodiment, as with the first embodiment, the aperture 102 is driven discretely at intervals of two steps in terms of the number of steps in view of the deterioration described above with reference to FIG. 2. It is also assumed that the interval between the upper limit and lower limit to the gain is two steps in terms of the number of steps, as with the first embodiment.

At the time t0, the exposure state is the correct exposure, at which the exposure control at the point P1 (the aperture value: Fn1, the gain: G1 dB) in the program diagram of FIG. 2 is being performed.

Assume that from this state, the subject brightness decreases by 0.6 steps during the time from the time t0 to the time t1. At the time t1, since the subject brightness has decreased, the exposure control unit 114 calculates a setting value for achieving the correct exposure. Here, since the subject brightness has decreased by 0.6 steps, the correct exposure is achieved by calculating the setting value of the aperture 102 so as to control exposure such that the subject brightness increases by 0.6 steps. Namely, the exposure control unit 114 controls the gain so as to increase the value thereof, and controls the aperture 102 so as to decrease the aperture value thereof. Note that at the time t1, the aperture value of the aperture 102 is Fn1, and the gain is G1 dB in the program diagram of FIG. 2. At this time, since the gain has reached the upper limit, the gain control unit 117 cannot raise the gain anymore. Therefore, the exposure control unit 114 increases exposure by changing the setting value of the aperture 102 from Fn1 to Fn0 to make a transition from the point P0 to the point P1. Namely, at the time t1, the exposure control unit 114 calculates the setting value (Fn0) of the aperture 102.

The aperture control unit 116 controls the aperture 102 according to the procedure of the aperture control process in FIG. 5. In the steps S501, S502, S308, and S309, the aperture control unit 116 calculates the first target value and second target value of the aperture 102 and the first drive speed and second drive speed of the aperture 102. The first target value of the aperture 102 should be a value that is obtained by changing the aperture value of the aperture 102 toward Fn0 by 0.6 steps from Fn1, which is the present value; however, the aperture 102 cannot be driven by 0.6 steps because the minimum drive resolution of the aperture 102 is 0.5 steps. For this reason, a maximum value at which the aperture 102 can be driven between the present value and the number of steps to the correct exposure (here, 0.6 steps) is adopted as the first target value of the aperture 102. In the present embodiment, it is assumed that the first target value of the aperture 102 is a value that is obtained by changing the aperture value by 0.5 steps from Fn1 toward Fn0. The second target value, first drive speed, and second drive speed of the aperture 102 are the same as those in the first embodiment. Then, in the step S310, the setting value of the aperture 102 is still the present aperture value (Fn1), and the aperture control unit 116 therefore determines that the aperture 102 has not reached the first target value. After that, in the steps S314 and S315 as with the first embodiment, the aperture control unit 116 sets the first target value as the target value of the aperture 102 and sets the first drive speed as the drive speed of the aperture 102, for the lens apparatus 100. After that, in the step S316, the aperture control unit 116 issues an instruction to start driving the aperture 102, drives the aperture 102 at the first drive speed until the first target value is reached, and finishes controlling the aperture 102.

At the time t2, the aperture 102 has reached the first target value (the aperture value shifted 0.5 steps from Fn1 toward Fn0). Thus, at the time t2, although the exposure has increased by 0.5 steps as compared to the time t1, the exposure is 0.1 steps smaller than the correct exposure. However, it is necessary to further change the aperture value of the aperture 102 by the remaining 1.5 steps toward Fn0 at the time t2, because the exposure control is performed by driving the aperture 102 and changing aperture value two steps at a time in terms of the number of steps according to the program diagram of FIG. 2.

In the aperture control process that is repeated periodically, upon determining in the step S310 that the aperture 102 has reached the first target value, the aperture control unit 116 executes the steps S311 to S313, S316, and S317, as with the first embodiment.

The exposure control unit 114 calculates a setting value of gain based on the various types of information about aperture control, which the exposure control unit 114 was notified of in the step S317 by the aperture control unit 116. Specifically, the exposure control unit 114 adjusts the gain so that the correct exposure can be maintained even after the aperture 102 reaches the first target value, namely, a change in brightness caused by changing of the aperture value of the aperture 102 by additional 1.5 steps toward the opening direction can be compensated for. For example, first, the exposure control unit 114 obtains a slope of the number of steps based on the present value, target value, and drive speed of the aperture 102, which the exposure control unit 114 was notified of by the aperture control unit 116, and sets a gain according to the obtained slope so as to compensate for a change in exposure (change in brightness) caused by the operation of the aperture 102 from the time t2 onward. In the case illustrated in FIG. 6, at the time t2, the exposure is 0.1 steps smaller and an image is dark than the correct exposure, and the aperture 102 is driven the remaining 1.5 steps from the time t2 to the time t6. Namely, it is calculated that the aperture 102 moves 0.3 steps or more during the period from the time t2 to the time t3. For this reason, when no gain is set, the exposure is 0.2 steps more than the correct exposure, and hence the image is too bright. For this reason, the gain control unit 117 is controlled at the time t2 to change the gain so as to make the image darker by an exposure of 0.2 steps at the time t3.

At the time t3, the exposure is the correct exposure due to the exposure state at the time t2, change in exposure by the aperture 102 from the time t2, and adjustment of the exposure by changing the gain in view of them. From the time t3 onward, the aperture 102 continues to be driven by the remaining 1.2 steps, and hence as with the first embodiment, the gain is set such that the correct exposure is maintained in view of the operation of the aperture 102. Thus, during the period from the time t2 to the time t6, the correct exposure is maintained by compensating for the change in exposure. The first target value is set to an aperture value that is obtained by shifting by 0.5 steps smaller than 0.6 steps, which is the number of steps to the correct exposure at the time t1, in view of the minimum drive resolution of the aperture 102, and the aperture 102 is driven at the first drive speed. As a result, the correct exposure can be achieved within a relatively short period of time.

As described above, according to the present embodiment that is an improvement of the first embodiment, even when the aperture 102 cannot be changed to a value that is the number of steps to the correct exposure away from the present value in view of the minimum drive resolution of the aperture 102, the correct exposure can be achieved within a relatively short period of time. Therefore, irrespective of the value of the minimum drive resolution of the aperture 102, the following three effects can be achieved at the same time: reducing the deterioration of the aperture 102, reducing changes in the exposure of an image caused by exposure control, and shortening the time required to achieve the correct exposure.

Although the present invention has been described in detail with reference to the preferred embodiments, the present invention should not be limited to those specific embodiments, but the present invention may be applied to various arrangements as long as they do not depart from the spirits of the present invention. Some of the embodiments described above may be combined together as appropriate.

Moreover, the embodiments described above can also be realized by a process in which a program that realizes one or more functions is provided to a computer of a system or apparatus via a network or storage medium, and a system control unit of the system or apparatus reads out and executes the program. The system control unit has one or more processors or circuits and may include a plurality of separate system control units or a network of a plurality of separate processors or separate circuits so as to read out and execute executable instructions.

The processors or circuits may include a central processing unit (CPU), a micro processing unit (MPU), a graphics processing unit (GPU), an application specific integrated circuit (ASIC), or a field programmable gate array (FPGA). The processors or circuits may also include a digital signal processor (DSP), a data flow processor (DFP), or a neural processing unit (NPU).

Therefore, a program code itself provided to and installed in a computer in order to cause the computer to realize the functional processing of the present invention also realizes the present invention. Namely, a program code itself for realizing the functional processing of the present invention is also included in the present invention.

In this case, a program may be of any type such as an object code, a program executed by an interpreter, and script data provided to an OS as long as they have functions of a program.

The storage medium for providing the program may be, for example, a hard disk, a magnetic recording medium such as magnetic tape, an optical/magneto-optical storage medium, or a nonvolatile semiconductor memory.

The program may be provided by storing a computer program forming the present invention in a server on a computer network, and causing a client computer connecting to the server to download the computer program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-137281, filed Aug. 25, 2021, which is hereby incorporated by reference wherein in its entirety.

What is claimed is:

1. An image pickup apparatus that picks up an image, comprising:
   an aperture configured to be driven to adjust an amount of light entering the image pickup apparatus;
   an image pickup device configured to photoelectrically convert a flux of the entered light to generate an image signal;
   at least one memory that stores a set of instructions; and
   at least one processor that executes the set of instructions, the set of instructions, when being executed, causing the image pickup apparatus to:
   calculate a subject brightness value from the image signal generated by the image pickup device;
   calculate a correct exposure based on the calculated subject brightness value;
   discretely calculate a setting value of the aperture based on the correct exposure;
   calculate a first target value based on a present value of the aperture and the correct exposure;
   calculate a second target value, which is closer to the setting value than the first target value, based on the present value of the aperture, the correct exposure, and the first target value; and
   while the aperture is being driven to reach the second target value from the first target value, change at least one of a shutter speed for image pickup and a gain to be applied to the image signal,
   wherein the aperture is driven at a first drive speed to reach the first target value and then driven at a second drive speed to reach the second target value.

2. The image pickup apparatus according to claim 1, wherein the first target value is set within a range between the present value and the setting value of the aperture.

3. The image pickup apparatus according to claim 1, wherein the second target value is set as the setting value.

4. The image pickup apparatus according to claim 1, wherein the at least one processor executes the set of instructions to, while the aperture is being driven to reach the second target value from the first target value, change at least one of the shutter speed and the gain so as to achieve the correct exposure.

5. The image pickup apparatus according to claim 1, wherein the second drive speed is lower than the first drive speed.

6. The image pickup apparatus according to claim 1, wherein the first target value is set to an aperture value that is discrete relative to a minimum drive resolution of the aperture.

7. The image pickup apparatus according to claim 6, wherein
   the at least one processor executes the set of instructions to obtain the number of steps from a present exposure to the correct exposure; and
   the first target value is set to a value that is the obtained number of steps away from the present value of the aperture.

8. The image pickup apparatus according to claim 7, wherein in a case where the obtained number of steps is not a multiple of the minimum drive resolution of the aperture, the first target value is set to a maximum value at which the aperture can be driven within a range of the obtained number of steps.

9. The image pickup apparatus according to claim 1, wherein the second target value is set to an aperture value that is discrete relative to a minimum drive resolution of the aperture.

10. The image pickup apparatus according to claim 1, wherein only in a case where a shooting condition is a predetermined shooting condition, the aperture is driven at the first drive speed to reach the first target value and then driven at the second drive speed to reach the second target value.

11. The image pickup apparatus according to claim 10, wherein the predetermined shooting condition is that a frequency with which the aperture is driven is equal to or greater than a predetermined frequency.

12. The image pickup apparatus according to claim 10, wherein the predetermined shooting condition is that the aperture does not have a durability equal to or greater than a predetermined durability.

13. A control method for an image pickup apparatus that picks up an image, wherein the image pickup apparatus comprising an aperture configured to be driven to adjust an amount of light entering the image pickup apparatus, and an image pickup device configured to photoelectrically convert a light flux of the entered light to generate an image signal, the control method comprising:

calculating a subject brightness value from the image signal generated by the image pickup device;

calculating a correct exposure based on the calculated subject brightness value;

discretely calculating a setting value of the aperture based on the correct exposure;

calculating a first target value based on a present value of the aperture and the correct exposure;

calculating a second target value, which is closer to the setting value than the first target value, based on the present value of the aperture, the correct exposure, and the first target value; and while the aperture is being driven to reach the second target value from the first target value, changing at least one of a shutter speed for image pickup and a gain to be applied to the image signal, wherein the aperture is driven at a first drive speed to reach the first target value and then driven at a second drive speed to reach the second target value.

14. A computer-readable non-transitory storage medium storing a program for causing a computer to execute a control method for an image pickup apparatus, the control method comprising:

calculating a subject brightness value from the image signal generated by the image pickup device;

calculating a correct exposure based on the calculated obtained subject brightness value;

discretely calculating a setting value of the aperture based on the correct exposure;

calculating a first target value based on a present value of the aperture and the correct exposure;

calculating a second target value, which is closer to the setting value than the first target value, based on the present value of the aperture, the correct exposure, and the first target value; and while the aperture is being driven to reach the second target value from the first target value, changing at least one of a shutter speed for image pickup and a gain to be applied to the image signal, wherein the aperture is driven at a first drive speed to reach the first target value and then driven at a second drive speed to reach the second target value.

* * * * *